July 16, 1963 W. E. BENNINGHOFF ETAL 3,098,146
RESISTANCE WELDING METHOD AND APPARATUS
Filed Sept. 8, 1960
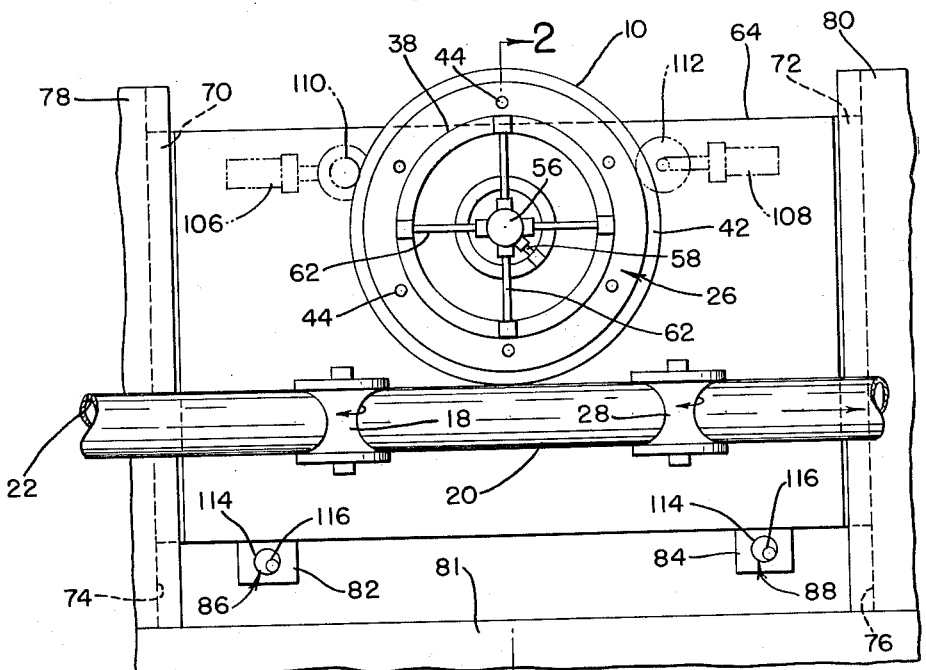
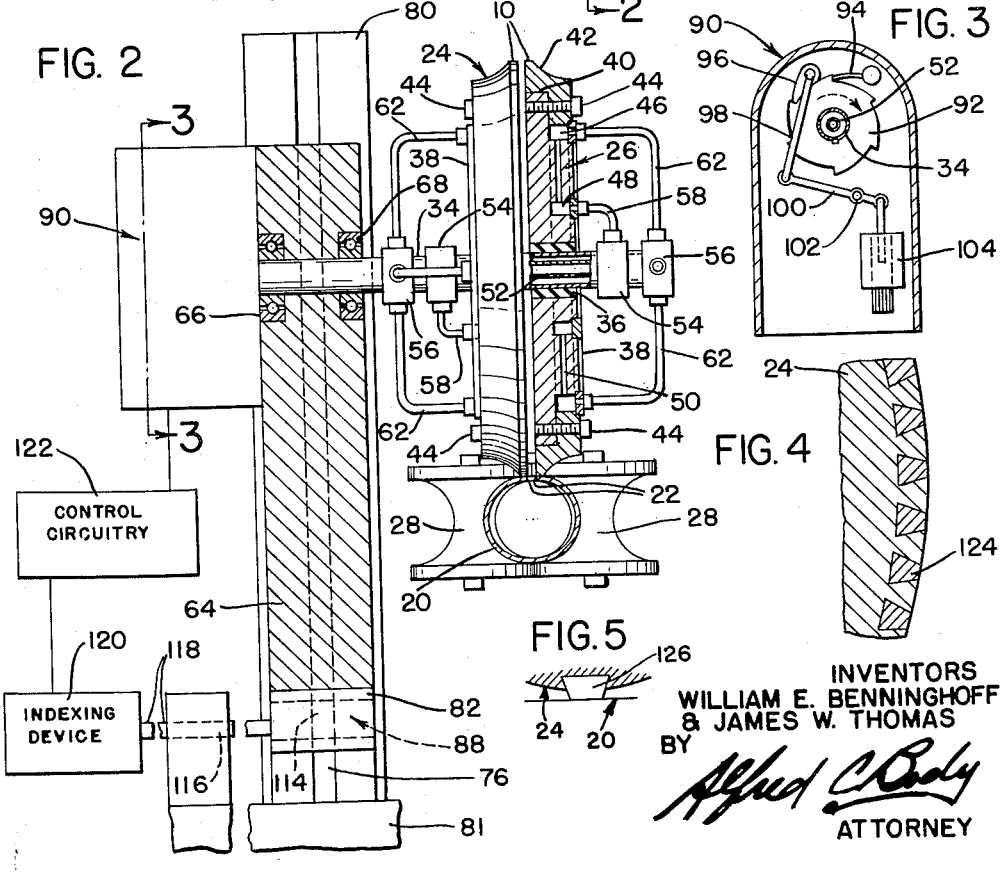
INVENTORS
WILLIAM E. BENNINGHOFF
& JAMES W. THOMAS
BY
Alfred C. Body
ATTORNEY US 3,098,146
Patented July 16, 1963

3,098,146
RESISTANCE WELDING METHOD AND APPARATUS
William E. Benninghoff, Brecksville, and James W. Thomas, Brook Park, Ohio, assignors to The Ohio Crankshaft Company, Cleveland, Ohio, a corporation of Ohio
Filed Sept. 8, 1960, Ser. No. 54,712
10 Claims. (Cl. 219—59)

This invention pertains to the art of continuous seam welding and more particularly to method and apparatus for continuous seam welding of C-shaped metallic strip into tubing, pipe, or the like by the contact resistance method.

In the art of contact resistance welding, it has been conventional in the past to provide a pair of electrodes which engage the opposite edges of the seam to be welded close to the point where the edges are brought into engagement and conduct welding current to such edges which flows between the edges and raises the edges to the welding temperature. These electrodes have heretofore taken the form of rotating wheels with their periphery moving at the same speed as the edges and in contact therewith.

In either case, the electrical currents being handled are such that a slight amount of arcing continuously occurs which results in a pitting of the electrodes requiring frequent shutdowns to either replace the electrodes or to repair the damaged contact surfaces thereof. This down time is quite expensive when measured in terms of non-use of equipment and idle manpower waiting for completion of these repair operations.

The present invention contemplates a method and apparatus for contact resistance welding which overcomes all of the above referred to difficulties and others and provides contact resistance welding electrodes which will operatae for long periods of time without need for shutting down the machinery in order to repair or replace the electrodes.

In accordance with the present invention, the electrodes are in the form of a round contact wheel similar to present roller electrodes, but instead of rotating at a peripheral speed equal to the line of movement speed of the edges, they have a peripheral speed substantially different than the line of movement speed of the edges such that the periphery is in sliding frictional engagement with the edges. Such sliding engagement will cause wear on the periphery and means are provided for dressing the periphery to eliminate the effect of such wear, or indexing the wheels so as to bring a new spot on the periphery into sliding engagement with the edges. Such means may be in the form of power means for causing the wheel to rotate or index at the desired speed or time, an indexing mechanism that prevents rotation of the wheel but allows it to be rotated through a small arc periodically.

In one aspect of the invention, the wheel is held stationary and as wear produces a flat spot, the wheel is indexed to a new contact area and the flat spot is dressed off.

With such an arrangement, the contact wheel will ultimately have a plurality of flat spots on its periphery, and further in accordance with the invention, means are provided for continuously dressing the periphery of the wheel so as to remove the flat spots and the damaged areas thereat due to the pitting of the periphery.

In another aspect of the invention, the wheel is rotated continuously and slowly in a direction opposite to the direction of movement of the edges, and the wheel is dressed either periodically or continuously.

With such an arrangement any pitting from arcing is immediately burnished by the frictional engagement with the edges and any dirt which might accumulate on the entrant side of the area of contact is continuously removed.

Further in accordance with the invention, the electrode wheel is provided with means for circulating cooling water therethrough so as to remove not only heat generated by the electrical current flowing through the electrode, but also heat generated by means of the friction between the periphery of the wheel and the edges.

Further in accordance with the invention, an electrode is provided having a separable outer angular rim which may be periodically removed so that when a wheel has been dressed down to its maximum extent, the rim may be readily replaced with a minimum of down time of the machine.

Still further in accordance with the invention, the periphery of the welding electrode is provided with a plurality of removable inserts arranged to have high wear resistant capabilities such that when a particular insert is worn, it may be indexed out of contact with the edges so that it may be replaced without stopping the operation of the welding apparatus.

The principal object of the invention is the provision of a new and improved electrode arrangement for continuous seam welding machines which is simple in construction and which enables the machine to operate for maximum periods of time without being shut down to replace welding electrodes.

Another object of the invention is the provision of a new and improved electrode arrangement wherein the electrode is in the form of a wheel but is held in fixed sliding engagement with the edges to which it is conducting current in combination with means for indexing the wheel through a small arc when the surface in contact with the edges becomes worn or pitted.

Still another object of the invention is the provision for a new and improved seam welding electrode of the general type described wherein the electrode has a removable rim so that when it is worn down or dressed down, it may be readily replaced with a minimum of down time.

Still another object of the invention is the provision of a new and improved welding electrode for continuous seam welding apparatus which is in the form of a wheel having a plurality of removable wear resistant inserts in the periphery, such inserts when they are indexed out of contact with the edges being readily replaceable while the welding apparatus is in operation so that the machine may continue to function for long periods of time without being shut down.

The invention may take physical form in certain parts and arrangements of parts, the preferred embodiment of which will be described in detail in this specification and illustrated in the accompanying drawing which is a part hereof and wherein:

FIGURE 1 is a side or elevational view of one embodiment of the invention;

FIGURE 2 is a partial cross-sectional view of the apparatus of the invention taken substantially along line 2—2 of FIGURE 1;

FIGURE 3 is a cross-sectional view of the indexing apparatus of the invention taken along line 3—3 of the FIGURE 2;

FIGURE 4 is a partially broken away side view of another embodiment of the invention employing replaceable inserts on the outer periphery of the electrodes; and FIGURE 5 is a fragmentary view illustrating a modification of the embodiment shown in FIGURE 4.

Referring now to the drawings wherein the showings are for the purposes of illustrating a preferred embodiment of the invention only and not for the purposes of limiting same, FIGURES 1 and 2 show somewhat schematically a C-shaped skelp 20 having spaced edges 22 to be welded moving continuously from left to right through a generally conventional seam welding mill consisting generally of a pair of guide rolls 18, a pair of closure rolls 28, and a pair of generally circular or disc-like electrodes 24, 26 constructed in accordance with and operated in accordance with the present invention. The guide rolls 18 form no part of the present invention, and simply serve to locate the edges 22 of the skelp 20 relative to the contact surfaces 10 on the electrodes 24, 26, as well as controlling the spaces of the edges 22 when in contact with the contact surfaces 10, all in accordance with standard tube mill techniques. It will be appreciated that other means such as a spaced (not shown) between the edges 22 may be located in the line of movement of the skelp 20 between the rolls 18 and the electrodes 24 and 26 for the purpose of more accurately spacing the edges 22.

The closure rolls 28 are relatively conventional in the art and are located in the line of movement of the skelp 20 immediately after the electrodes 24, 26. The spacing being adjustable if desired so as to obtain the optimum spacing for the best welding conditions.

Suitable means, not shown, are provided for connecting the electrodes 24, 26 to the output of an electrical power source whereby electrical current will flow, for example, from one electrode 24 along the edge which this electrode engages to the point where the edges are brought into engagement by the closure rolls 28 across the edge and then back along the edge to the other electrode 26.

It is preferred that the electrodes 24, 26 be energized from a suitable source of high frequency electrical energy such that as is known, the currents will then concentrate on the surfaces of the edges to pre-heat these edges by I²R losses during the time that the edges are moving from the electrodes to the point that the edges are brought into abutting engagement by the closure rolls 28 where the concentrated flow of current between the edges rapidly raises the edges to the fusion temperatures such that a welding action will result.

As is best shown in FIGURE 2, the electrodes 24 and 26 are mounted on a hollow shaft 34 and insulated therefrom by means of insulating bushings 36. Each electrode comprises an inner circular element 38 having a stepped outer periphery as at 40. Encircling the periphery of the circular element is an annular element 42 having an inner periphery adapted to snugly abut the periphery of circular element 38 and an outer periphery adapted to abut one edge of the seam 22. Bolts 44 or other suitable fastening means serve to removably secure the two elements together.

It will be appreciated that during a welding operation the electrodes 24 and 26 become heated, both due to the I²R loss and due to the friction at the point of contact between the electrode and the tube 20. Accordingly, cooling means are provided for the electrodes, which cooling means includes an annular outer passageway 46 milled in the periphery of element 38 and an inner annular passageway 48 milled on the inner radial portion of the same element 38. Radial passageways 50 serve to inner connect the two annular passageways 46 and 48.

It will be noted that the hollow shaft 34 contains an inner, coaxial tube 52 which communicates with rotatable fluid couplings 54. In a similar manner, the interior of shaft 34 communicates with a second rotatable fluid coupling 56. Fluid coupling 54 is connected through rubber hoses 58 or the like to the annular passageway 48. Likewise, fluid coupling 56 is connected through hoses 62 to the annular passageway 46. In this manner, a cooling fluid, such as water or compressed air, may be conducted through the interior of shaft 34, through fluid coupling 56 and hoses 62 to the annular passageway 46. From passageway 46 the fluid will flow through radial passageways 50 to the annular passageway 48 where it may be conducted through hose 58 and fluid coupling 54 to the tube 52, it being understood that the shaft 34 is connected to a suitable source of fluid under pressure, not shown.

As shown in FIGURE 2, the shaft 34 and the electrodes 24 and 26 carried thereby are supported on a supporting member or block 64 having bearings 66 and 68 therein within which the shaft 34 is journaled. As is best shown in FIGURE 1, the opposite ends of the blocks 64 are provided with projections 70 and 72 adapted to slide within slots 74 and 76 on a pair of vertically-extending guideways 78 and 80 which are supported on a base 81. The under surface of block 64 rests on blocks 82 and 84 which are, in turn, carried on rotatable eccentrics 86 and 88, the arrangement being such that as the eccentrics 86 and 88 are rotated, the blocks 64 and the electrodes 24 and 26 may be elevated or lowered to suit requirements.

As was explained above, in prior art devices of this type the electrodes 24 and 26 are rotated continuously during a welding operation whereby rolling contact is obtained between the peripheries of the electrodes and the opposite sides of the seam 22 in tube 20. Due to arcing between the electrodes and the tube, however, the peripheries of the electrodes became pitted so that it was necessary to periodically shut down the apparatus to redress the outside diameters of the electrodes. In the present invention, on the other hand, the electrodes 24 and 26 remain stationary during a welding operation whereby sliding line contact is obtained between their peripheries and the tube 20. When this point of sliding line contact becomes worn or pitted, the electrodes 24 and 26 are rotated through short arcs to a new stationary position where a fresh area of line contact is presented to the tube 20.

It is appreciated that "line" contact can only exist when the electrodes are perfectly round and that because of the wear of the surface of the electrodes line contact will only exist momentarily and that thereafter a "flat" of gradually increasing width will engage the tube 20. For the purposes of simplicity, however, "line" contact is used throughout this specification and claims.

To effect indexing of the electrodes 24 and 26 in the desired manner, an indexing mechanism, generally indicated at 90, is provided. The indexing mechanism, shown in FIGURE 3, is carried on the side of block 64 opposite the electrodes 24 and 26; and, as best shown in FIGURE 4, includes a ratchet wheel 92 which is keyed or otherwise securely fastened to the shaft 34. Normally, the ratchet wheel 92 will tend to rotate in the direction of the broken arrow as the tube 20 passes under the electrodes; however, this rotation is prevented by the combined action of leaf spring 94 and pawl 96. The pawl 96 is connected through linkage 98 to a lever 100 which is pivoted between its ends as at 102. The other end of the lever 100 is connected to a solenoid 104, substantially as shown. In order to index the electrodes 24 and 26 through a short arc, the solenoid 104 will be actuated to rotate the linkage 100 in a counter-clockwise direction as viewed in FIGURE 3 to cause pawl 96 to move downwardly and thereby rotate the ratchet wheel 92 and electrodes 24 and 26 through a short arc determined by the design of the ratchet wheel. After the electrodes 24 and 26 thus rotate through a short arc, the solenoid 104 is returned to its initial position to rotate linkage 100 in a clockwise direction and thereby return the pawl 96 to its original position preparatory to the next successive indexing operation. Although the indexing device shown in FIGURE 3 will perform satisfactorily for its intended purpose, it is to be understood that other and different types of indexing devices may be used to suit requirements, the important thing being that the electrodes 24 and 26 are moved through short arcs at periodic intervals to present a new line of contact with the tube 20.

Also included in the assembly, as best shown in FIGURE 1, are a pair of wheel dressing units 106 and 108 which may be supported on the plate 64 or otherwise suitably mounted whereby the dressing wheels 110 and 112 of the dressing units may be brought into contact with the peripheries of electrodes 24 and 26, respectively. As will be understood, wheel dressing units 106 and 108 are insulated from the remainder of the structure and may be spring biased, for example, in order to bring the dressing wheels 110 and 112 into contact with the respective peripheries of the electrodes. As was explained above, the surface of the periphery of the electrodes 24 and 26 will become pitted or worn during a welding operation. Such pits or worn spots may be removed from the peripheries by the action of the dressing wheels 110 and 112 which are driven by motor devices, not shown. During a dressing or grinding operation, the diameters of the electrodes 24 and 26 will, of course, become reduced. Accordingly, if the dressing units 106 and 108 are spring biased toward the periphery of the electrodes 24 and 26, they will be automatically urged against the periphery regardless of the diameters of the electrodes. If, on the other hand, the wheel dressing units 106 and 108 are not spring biased toward the electrodes, then suitable indexing devices, similar to that shown in FIGURE 3 may be provided for this purpose.

As the diameters of the electrodes 24 and 26 become reduced during the dressing operation, the electrodes must be lowered in order to bring their peripheries into contact with the tube 20. To this end, the blocks 82 and 84 and the eccentrics 86 and 88 are provided. As is shown in FIGURE 2, each of the eccentrics has a first cylindrical portion 114 rotatable in a bore provided in the block 82 or 84 and a second cylindrical portion 116 which is offset with respect of the portion 114 and integral therewith. The portion 116 is connected through mechanical linkage 118 to an indexing device 120 which may, for example, be similar to the indexing device shown in FIGURE 3. Control circuit 122 is provided for controlling the indexing devices 90 and 120 such that the electrodes 24 and 26 will be indexed through short arcs at periodic intervals. The interval of time between indexes can be determined by checking actual production runs and thereby establishing maximum time intervals which are permissible before the electrodes must be indexed. That is, electrodes 24 and 26 will be indexed to rotate through short arcs after they have become pitted or worn to a certain extent. After one complete revolution of the electrodes 24 and 26, their diameters will be reduced due to the action of dressing units 106 and 108. Consequently, the electrodes must be lowered in order to bring them into contact with the tube 20; and to this end the eccentrics 86 and 88 are provided, the arrangement being such that the control circuitry 122 will actuate indexing device 120 to rotate the eccentrics 86 and 88 to lower the electrodes 24 and 26 after each complete revolution.

After the annular element 42 on each electrode has been used for a certain period of time, the dressing action of the wheels 110 and 112 will reduce its diameter to the point where it is no longer useable. At this time, the bolts 44 may be loosened and the annular element 42 replaced by a new element without requiring a complete replacement of the entire electrode 24 or 26.

In FIG. 4, another embodiment of the invention is shown wherein the electrode 24 or 26 is provided with a plurality of removable inserts 124 in its periphery. The indexing device 90 would then be operated whereby successive inserts 124 are presented to the opposite sides of the seam 22. After the inserts 124 become worn after repeated dressing, they may be replaced as was the element 42 in the embodiment shown in FIGURE 2. If desired, the inserts 124 may have flat peripheral surfaces to provide a greater contact area between the electrode and the tube. See FIGURE 5, wherein such a flat insert 126 is illustrated. This type of electrode would then require a mechanism which would rotate the eccentrics 86 and 88 to elevate the electrodes a slight amount to allow the corner of the flat area of each insert 124 to swing past. The eccentrics 86 and 88 would the be rotated in the opposite direction to bring the electrodes back into contact with the tube.

In another embodiment of the invention the electrodes 24, 26 may be continuously rotated but at a peripheral speed substantially different from the line of movement speed of the tube 20. With such an arrangement it will be appreciated that the edges 10 are in sliding frictional electrical contact with the edges 22 at all times. However, with such an arrangement, the wear on the edges 10 will be uniform and the flat spots of the first described embodiment would not appear.

In one preferred embodiment, the electrodes 24, 26 are rotated at a speed of approximately one revolution per minute, although, obviously, greater or less speeds may be employed. Preferably, if the electrodes 24, 26 are continuously rotated, the direction of movement of the periphery should be opposite to that of the direction of movement of the tube 20. It will be appreciated that any pits which might be formed in the edges 10 due to arcing will always be formed at the exit side of the area of contact of the periphery 10 with the edges 22. With the electrodes 24, 26 rotating in a direction opposite to the direction of movement of the edges 22, the pit will immediately be brought into frictional sliding contact with the edges 22 and the pitted area will be burnished over as soon as it is formed.

Any suitable means such as a gear motor may be employed for rotating the electrodes 24, 26 at the desired speed and in the desired direction.

The same dressing means as described with reference to the preferred embodiment may be employed for either continuously or periodically dressing the periphery 10 of the electrodes 24, 26 to eliminate the effects of wear or pitting.

It will also be appreciated that in rotating the electrodes 24, 26 in a direction opposite to the direction of movement of the tube 20, any dirt, scale or slivers of metal which might become wedged in the entrant angle formed by the periphery 10 and the edges 22, will be continuously dislodged or removed from the apex of the angle such that the dressing mechanism can subsequently remove it from the periphery 10 if such dirt or the like adheres to the periphery 10.

It can thus be seen that the present invention provides a new and improved method and apparatus for resistance seam welding wherein down time is minimized. Although the invention has been shown in connection with certain specific embodiments, it will be readily apparent to those skilled in the art that various changes in form and arrangement of parts may be made to suit requirements without departing from the spirit and scope of the invention.

Having thus described our invention, we claim:

1. In apparatus for seam welding moving material, a pair of coaxial disc-like electrodes each of which is insulated from the other and adapted to engage one edge of the seam to be welded, and an indexing device for rotating the electrodes about a stationary axis through short arcs at spaced intervals as the material to be welded moves thereby, whereby electrical power may be transmitted from the electrodes to the material by sliding contact at spaced points around the peripheries of the electrodes.

2. Apparatus for seam welding material having a pair of parallel adjacent edges comprising means for moving said material along a path extending parallel to said edges, a pair of coaxial disc-like electrodes each of which is insulated from the other and adapted to engage one of the adjacent edges to be welded in such a manner that the axis of the electrodes is substantially at right angles to the direction of movement of the material, and apparatus for rotating the electrodes through short arcs at spaced intervals during a welding operation whereby electrical power may be transmitted from the electrodes to the material to be welded by sliding contact at spaced points around the peripheries of the electrodes.

3. Apparatus for seam welding material having a pair of converging adjacent edges comprising means for moving said material along a path extending parallel to said edges, a pair of coaxial disc-like electrodes each of which is insulated from the other and adapted to engage one of the adjacent edges to be welded in such a manner that the axis of the electrodes is substantially perpendicular to the direction of movement of the material, a plurality of removable inserts circumferentially spaced around the peripheries of the electrodes, and an indexing device for rotating the electrodes through short arcs at spaced intervals during a welding operation whereby electrical power may be transmitted from the electrodes to the material to be welded by sliding line contact between successive ones of the inserts and the material.

4. The combination claimed in claim 3 wherein the surface of each insert on the peripheries of the disc-like electrodes is flat and extends tangential to its associated disc-like electrode, and means for moving the disc-like electrodes away from the material to be welded whenever the indexing device rotates the electrodes through short arcs.

5. In apparatus for seam welding moving material, a pair of disc-like electrodes each of which is insulated from the other, and adapted to engage one edge of the seam to be welded, each of said electrodes comprising an inner circular part and an outer annular part encircling the periphery of the circular part, means for removably securing the annular part to said circular part, and an indexing device for rotating the electrodes about a stationary axis through short arcs at spaced intervals as the material to be welded moves thereby whereby electrical power may be transmitted from the electrodes to the material by sliding contact at spaced points around the peripheries of the electrodes.

6. Apparatus for seam welding material having a pair of parallel adjacent edges comprising means for moving the material to be welded along a path extending parallel to said edges, a pair of coaxial disc-like electrodes each of which is insulated from the other and adapted to engage one of the adjacent edges to be welded in such a manner that the axis of the electrodes is substantially perpendicular to the direction of movement of the material, apparatus for rotating the electrodes through short arcs at spaced intervals during a welding operation whereby electrical power may be transmitted from the electrodes to the material to be welded by sliding contact at spaced points around the peripheries of the electrodes, abrasive wheels removed from the point of line contact and adapted to engage the peripheries of the electrodes to dress the outer edges of the electrodes, and apparatus for moving the axis of the electrodes closer to the material to be welded after each revolution of the electrodes to compensate for the reduction in diameter of the electrodes due to the action of said abrasive wheels.

7. A method for resistance welding a seam by the use of a pair of rotatable electrodes having their respective peripheries engaging the opposite sides of the seam to be welded, which comprises moving the material to be welded along a path extending parallel to said seam, and indexing the electrodes through short arcs at spaced intervals during a welding operation whereby electrical power may be transmitted from the electrodes to the material to be welded by sliding contact at spaced points around the peripheries of the electrodes.

8. A method for resistance welding a seam by the use of a pair of rotatable electrodes having their respective peripheries engaging the opposite sides of the seam to be welded which comprises moving the material to be welded along a path extending parallel to said seam, continuously contacting the edges of said seam with said electrodes, and continuously rotating said electrodes in a direction opposite to the movement of the material to be welded.

9. A method for resistance welding a seam by the use of a pair of rotatable electrodes having their respective peripheries engaging the opposite sides of the seam to be welded which comprises moving the material to be welded along a path extending parallel to said seam and continuously rotating said electrode at a peripheral speed substantially different from that of the speed of movement of said edges.

10. Apparatus for continuous welding of a seam of a C-shaped tube comprising means for continuously advancing said C-shaped tube along a predetermined path at a predetermined lineal speed, said electrodes being mounted for rotation with the peripheries thereof engaging the edges of said tube and means for rotating said electrodes at a peripheral speed different than the lineal speed of said tube.

References Cited in the file of this patent

UNITED STATES PATENTS

| | | |
|---|---|---|
| 1,548,691 | Thomson | Aug. 4, 1925 |
| 1,569,127 | Holt | Jan. 12, 1926 |
| 1,773,892 | Toleik | Aug. 26, 1930 |
| 2,512,460 | Henderson | June 20, 1950 |